United States Patent [19]
Filkorn

[11] 3,790,058
[45] Feb. 5, 1974

[54] APPARATUS FOR SHEARING WELD FLASH
[75] Inventor: Robert L. Filkorn, New Philadelphia, Ohio
[73] Assignee: General Electric Company, Schenectady, N.Y.
[22] Filed: May 12, 1972
[21] Appl. No.: 252,638

[52] U.S. Cl............................ 228/2, 228/13, 83/914
[51] Int. Cl.............................................. B23k 27/00
[58] Field of Search................ 228/19, 2, 13; 83/914

[56] References Cited
UNITED STATES PATENTS
| | | | |
|---|---|---|---|
| 3,438,561 | 4/1969 | Calton............................ | 228/2 UX |
| 3,525,144 | 8/1970 | Katunick et al................... | 29/471.1 |
| 3,662,941 | 5/1972 | Gage............................... | 228/2 |

FOREIGN PATENTS OR APPLICATIONS
1,425,943  12/1965  France
1,589,186  3/1970  France...................... 228/2

*Primary Examiner*—Richard B. Lazarus
*Attorney, Agent, or Firm*—John F. McDevitt; Henry P. Truesdell; Frank L. Neuhauser et al.

[57] ABSTRACT

The present invention deals with a process and apparatus for removing the weld flash from two workpieces that have been butt-welded together. More particularly, the weld flash is removed with a shearing action that is commenced before the weld has cooled sufficiently to introduce any further hardening of the workpieces. A particular shearing mechanism is employed which pre-positions the shearing tool adjacent to the weld location to facilitate the desired objective. A concentric shearing tool is also employed in the flash removal mechanism to remove all the flash in a single action.

5 Claims, 3 Drawing Figures

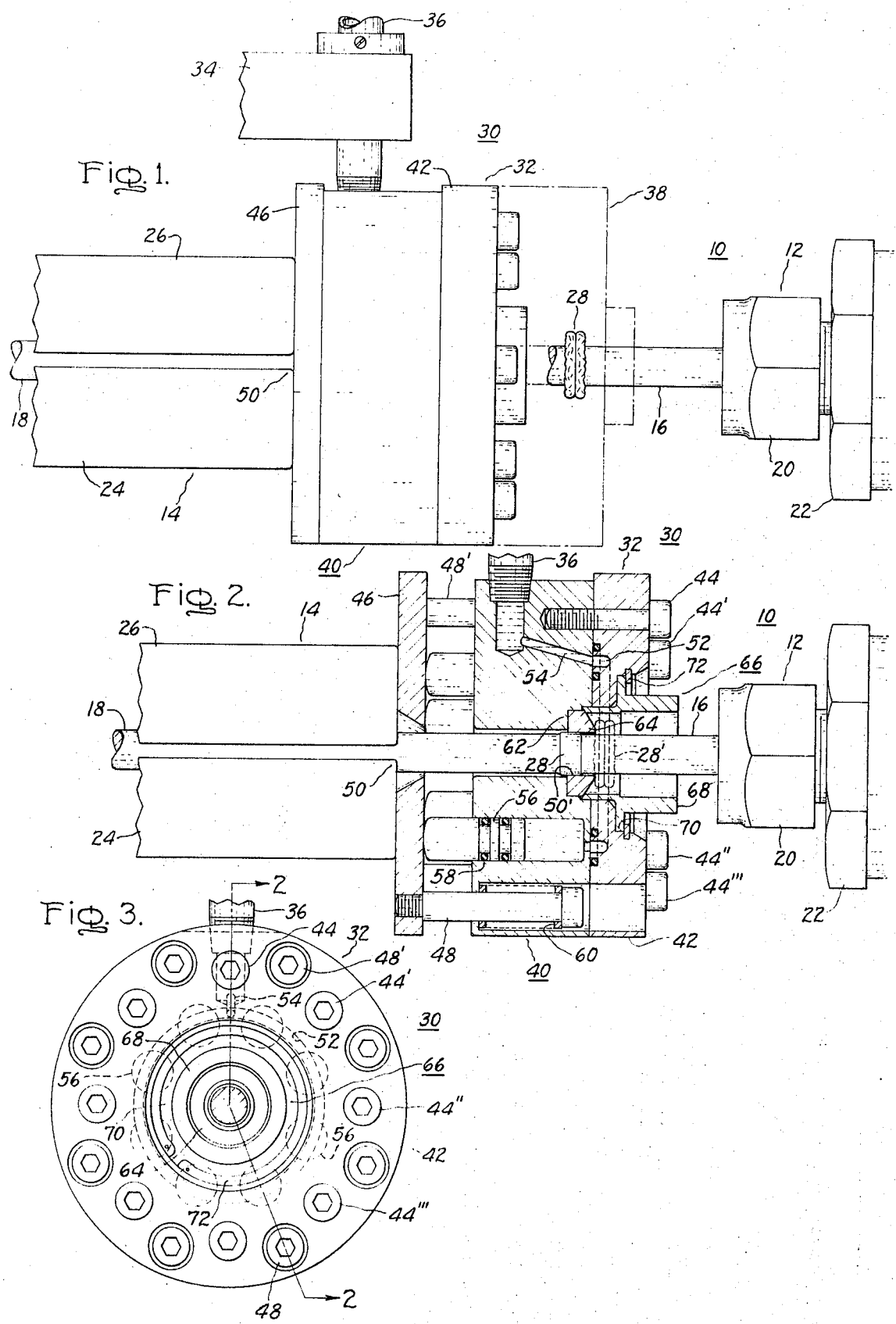

3,790,058

APPARATUS FOR SHEARING WELD FLASH

BACKGROUND OF THE INVENTION

The customary method to remove upset flash material which remains after two workpieces have been butt-welded is a mechanical grinding or machining operation that takes place after the weld has cooled. When the workpieces are made of steel or some other material which becomes hardened by exposure to elevated temperatures, any time delay between welding and removal of the upset flash material can further harden the workpieces which makes the task of removing the weld flash more difficult. It may even become necessary to anneal the workpieces after welding in order to remove the weld flash by the customary grinding or machining operation.

Since the mechanical grinding operation is also accompanied by significant heating especially of small size workpieces such as fine wire or rod, there can be some further hardening of the workpieces with the customary method of flash removal. This could necessitate still further annealing of the workpieces after grinding when the physical properties of the final product are critical. Additionally, the mechanical grinding operation to remove weld flash is generally carried out with a device separate from the welder which requires clamping to the joined workpieces as well as subsequent removal by the welding operator.

SUMMARY OF THE INVENTION

It has now been discovered that the upset weld flash can be removed more effectively by means of a particular shearing mechanism which is actuated before the workpieces have cooled appreciably from welding. Specifically, the present process for welding and removal of the weld flash between the contacting end surfaces of a pair of workpieces that have been welded together involves:
  a. pre-positioning a concentric shearing tool before welding around the exterior surface of one workpiece for axial movement along the direction of axial alignment between both workpieces,
  b. butt-welding together the end surfaces of said workpieces, and
  c. actuating axial movement of the concentric shearing tool to remove the weld flash before the workpieces have cooled appreciably.

In the foregoing manner, the weld flash is effectively removed by the welding operator without one or more additional processing steps undertaken after welding to remove the flash by separate means. The particular shearing mechanism of the present invention to be hereinafter described in greater detail can also be timed to operate automatically as the final step in the welding process thereby further avoiding need for the operator's attention in removing the flash.

BRIEF DESCRIPTION OF THE DRAWINGS

FIG. 1 is a side elevation view showing two metal rods that have been butt-welded together in a friction-welding apparatus which includes the shearing mechanism of the present invention;

FIG. 2 shows the same apparatus depicted in FIG. 1 with the shearing mechanism being depicted in a cross section; and FIG. 3 is a front-face view of the same shearing mechanism.

DESCRIPTION OF THE PREFERRED EMBODIMENTS

Briefly stated, the present process and apparatus can be carried out in a preferred friction-welding embodiment to join the first workpiece to the second workpiece by means of relatively rotating the workpieces and forcing them into contact at a common interface which generates frictional heat and raises the workpieces to a suitable bonding temperature whereupon the relative rotation subsides and the workpieces become bonded together as follows:
  a. pre-positioning the concentric shearing tool before welding around the exterior surface of one workpiece for axial movement along the direction of axial alignment between said workpieces,
  b. moving the shearing tool for engagement with the weld flash before the workpieces have cooled appreciably,
  c. shearing the weld flash by continuing to move the shearing tool across the weld to displace the weld flash from the weld joint, and
  d. retracting the shearing tools to the pre-positioned location.

In FIG. 1 there is depicted in elevation an external view of the foregoing embodiment which generally comprises a friction-welding apparatus 10 such as disclosed in U.S. Pat. No. 3,451,608. More particularly, said apparatus includes a horizontally disposed arrangement of cooperating means to hold and process the individual workpieces for friction welding. Said cooperating means includes a headstock member 12 which is aligned with tailstock member 14 to permit alignment along the center longitudinal axis of workpieces 16 and 18, respectively, in the form of two metal rods. Metal rod 16 is gripped by collet element 20 which is rotatably mounted in a spindle member 22 in order to rotate metal rod 16 during the friction-welding process. Correspondingly, metal rod 18 is gripped by jaw elements 24 and 26 which form the engagement means of the tailstock member 14. Said tailstock member is slidably mounted by suitable means, such as rails or a lathe bed, permitting movement in the above defined axial direction in order to butt-weld the individual workpieces together. The upset flash resulting from friction welding in this manner is shown at 28 to help further describe the shearing mechanism and its mode of operation in the present invention.

The shearing mechanism 30 for removal of the weld flash comprises a cylindrical housing member 32 which is adapted to be supported by workpiece 18 for abutment with the jaw elements of the tailstock member. A mounting bracket 34 which is fixed to a supply means 36 for pressurized fluid to operate the shearing mechanism can also be attached to the welder for additional support of the mechanism when actuated. The pre-positioning of said shearing mechanism before actuation with respect to the weld flash can also be seen in FIG. 1 together with a phantom outline 38 depicting the axial movement which takes place during shearing.

FIG. 2 is a cross-sectional view of the shearing mechanism 30 depicting the cooperation which takes place between component parts in removing the weld flash. The cylindrical housing member includes a center body portion 40 to which is affixed a cover portion 42 by fastening means 44, 44', 44'' and 44''' as well as a base portion 46 being affixed to said body portion by spring-loaded fastening means 48, 48', etc. All said portions in the cylindrical housing member include a central bore opening 50 to allow passage of the workpiece 18 therethrough to pre-position the shearing mechanism before welding. Cover portion 42 includes a concentric fluid passageway 52 being aligned with fluid conduit means 54 in the central body portion that is connected to the supply of pressurized fluid for the shearing mechanism. Also disposed within the body portion 40 are a plurality of movable piston elements 56 being actuated by the pressurized fluid. More particularly, said piston elements are disposed concentrically in the cover portion to supply pressurized fluid at one end of each piston element. The opposite end of each movable piston element abuts with one major surface of base portion 46, and sealing means 58 are provided to prevent escape of pressurized fluid from the movable pistons. Movement of the piston elements caused by the pressurized fluid exerts a mechanical force to separate the body portion from the base portion of the cylindrical housing member and further causes compression of spring elements 60 which are operatively associated therewith. Upon removal of the ram force generated by the pressurized fluid with conventional relief means (not shown) in the piston chambers, the compressed spring forces operate to restore the body portion of the cylindrical housing member to the pre-positioned location.

A concentric shearing tool 62 is mounted upon a shoulder in the body portion of the cylindrical housing member for axial movement in the forward longitudinal direction by the ram means above described as well as axial movement in the rearward longitudinal direction by decompression of the spring elements. Said shearing tool is in the form of a ring member having its shearing tip 64 located to engage the weld flash 28 when the shearing tool is moved across the weld. The shearing tool is advantageously formed from hardened steel which has a lower coefficient of thermal conductivity than refractory metals in order to remove as little heat from the weld as possible during the shearing action. The central bore opening 50' of the shearing tool is sized to provide sufficient clearance distance for concentric mounting of the cylindrical housing member around the exterior surface of one workpiece rod with a further allowance being made to avert binding the shearing tool when the said workpiece is heated by welding. For purpose of illustrating the operation of said shearing mechanism in connection with the butt welding together of two ⅜ inch diameter workpiece rods, a clearance distance of approximately 0.015 inch was maintained between the center bore opening of the shearing tool and the exterior surface of the workpiece rod with a hydraulic pressure of approximately 4000–4500 psi providing sufficient ram force to shear the weld flash 28' produced in the above-described friction-welding embodiment.

FIG. 3 is a front-face view of the shearing mechanism 30 described in the aforementioned embodiment which includes a section line 2—2 coinciding with those parts depicted in previous FIG. 2. To the extent possible, the same numerals are used in the description of FIG. 3 as was used in FIG. 2 for clarity and ease of understanding. Specifically, the shearing mechanism includes the cylindrical housing member 32 having pressurized fluid supply means 36 connected to conduit 54 which communicates with fluid passageway 52 leading to the chambers containing piston elements 56. Cover portion 42 of said cylindrical housing member includes a concentrically disposed plurality of through holes to accommodate sliding insertion of the fastening means 48, 48', etc., when body portion 40 is in abutment relationship with base portion 46. Additional fastening means 44, 44', 44'' and 44''' are concentrically disposed in the cover portion to provide a pressure-type seal with the body portion by means of conventional sealing elements such as O-rings, gaskets, and the like. Also shown in both FIGS. 2–3 is an optional protection shield assembly 66 mounted in the cover portion for the purpose of deflecting loose upset material generated by the welding operation. Said protection shield assembly envelops the weld joint during the welding step when the body portion of said cylindrical housing member is in abutment relationship with base portion 46. Said protection shield assembly includes an open cylindrical element 68 having a flange portion 70 adapted for physical engagement with a conventional lock ring 72.

It will be apparent from the foregoing description that a general welding process and apparatus has been provided to remove the weld flash obtained between the contacting end surfaces of a pair of workpieces that have been butt-welded together. It is not intended to limit the present invention to the preferred friction-welding embodiment above described, however, since it will be apparent that various modifications in the basic welding process and apparatus can be made without departing from the spirit and scope of the present invention. For example, the particular shearing mechanism herein described and its mode of operation can be employed with a vertical welding apparatus wherein the workpieces are butt-welded together by electrical resistance heating without further modification. Additionally, it is further contemplated to actuate the present shearing mechanism automatically for operation immediately upon termination of the butt-welding step by already known means which can be associated with the welder or pressurized fluid circuit in the present shearing mechanism. Still further, it is contemplated to supply the ram force which operates said shearing mechanism in different ways than above shown such as with combined pneumatic and hydraulic circuits as well as cam means to provide the desired action of the shearing tool. It is intended to limit the present invention, therefore, only by the scope of the following claims.

I claim:

1. An improved friction-welding apparatus having a pair of gripping members to position workpieces in axial alignment for relative rotation therebetween, means for axially moving said gripping members so as to move the workpieces together for friction-welding, and a shearing mechanism for removal of weld flash between the contacting surfaces of said workpieces resulting from friction-welding, the improvement wherein said shearing mechanism comprises:

a. a housing member disposed between said gripping members for mounting a concentric shearing tool in axial alignment around the exterior surface of one workpiece in the direction of the central longitudinal axis of the workpieces, b. said housing member including a center body portion and a base portion which move apart by ram means disposed within said body portion, and c. means to actuate said ram means for engagement of the shearing tool with the weld flash while the workpieces are still being held by the gripping members.

2. A shearing mechanism as in claim 1 which further includes means disposed within said body portion to retract the shearing tool to its location preceding movement.

3. A shearing mechanism as in claim 1 wherein the ram means are activated by hydraulic means.

4. A shearing mechanism as in claim 1 which further includes shielding means disposed within said body portion to minimize heating of the shearing tool during welding.

5. A shearing mechanism as in claim 1 wherein the retraction is accomplished by mechanical spring means disposed within said body portion.

* * * * *